(12) United States Patent
Naito

(10) Patent No.: US 6,218,173 B1
(45) Date of Patent: Apr. 17, 2001

(54) ENGINE WITH MICROBIAL REACTION PURIFIER

(75) Inventor: Ken Naito, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/237,253

(22) Filed: Jan. 26, 1999

(30) Foreign Application Priority Data

Jan. 27, 1998 (JP) .................................................. 10-013960
Jun. 29, 1998 (JP) .................................................. 10-182317

(51) Int. Cl.⁷ .............................. C12S 5/00; B01D 53/92
(52) U.S. Cl. ........................ 435/266; 435/289.1; 60/273; 60/282
(58) Field of Search ................................... 435/266, 289.1, 435/293.1, 297.1, 297.2, 297.4, 300.1; 422/120, 168, 173; 60/282, 295, 297, 299, 310, 273

(56) References Cited

FOREIGN PATENT DOCUMENTS

| | | |
|---|---|---|
| 3-147777 | * 6/1991 | (JP) . |
| 1-175972 | * 7/1991 | (JP) . |
| 5-154341 | * 6/1993 | (JP) . |
| 8-141356 | * 6/1996 | (JP) . |
| 93/18800 | * 9/1993 | (WO) . |

OTHER PUBLICATIONS

T. Imanaka et al., "A New Mixotrophic Bacterium That Can Fix $CO_2$ and Assimilate Aliphatic and Aromatic Hydrocarbons Anaerobically", Mol. Bio. of Pseudo., (1996), pp. 289–297.

* cited by examiner

Primary Examiner—William H. Beisner
(74) Attorney, Agent, or Firm—Foley & Lardner

(57) ABSTRACT

A reaction purifier (100) using microorganisms which feed on harmful components in exhaust gas is installed in an exhaust passage (18, 21, 22, 23, 24) of an engine (1). The microorganisms are mixed with a culture fluid, and the culture fluid is circulated through tubes (111) in which micro holes (111A) are formed. The diameter of these holes is such as not to allow culture fluid to pass, but to allow exhaust gas to pass. The tubes (111) are housed in a casing (112), and harmful components are removed by leading exhaust gas into the casing (112) to bring into contact with the microorganisms in the culture fluid. By using the reaction purifier (100) and catalytic converter (20A, 20B) in conjunction, even better exhaust gas purifying performance is obtained.

48 Claims, 10 Drawing Sheets

100 REACTION PURIFIER
115 TEMPERATURE SENSOR
170 CONTROLLER

50 FUEL PUMP
54 PUMP
115 TEMPERATURE SENSOR
100 REACTION PURIFIER
170 CONTROLLER

ENGINE WITH MICROBIAL REACTION PURIFIER

FIELD OF THE INVENTION

This invention relates to the purification of engine exhaust gas using microorganisms.

BACKGROUND OF THE INVENTION

A method is known to purify harmful substances such as hydrocarbons (HC), carbon monoxide (CO), sulfur (S) and nitrogen oxides (NOx) contained in the exhaust gas discharged from a vehicle engine by using a metal catalyst. In such purification methods, however, processing ability is low when the catalyst is not fully activated, e.g. immediately after engine startup.

A method is also known to reduce the production of NOx in an engine by recirculating part of the exhaust gas into the engine intake air. In order to achieve considerable reduction of NOx, the exhaust recirculation amount must be large, for purifying harmful substances in the exhaust gas of an engine.

SUMMARY OF THE INVENTION

It is therefore an object of this invention to increase the purification efficiency of harmful substances contained in the exhaust gas of an engine.

In order to achieve the above object, this invention provides an engine comprising a combustion chamber for burning a mixture of fuel and air, an exhaust gas passage connected to said combustion chamber, and a reaction purifier installed in said passage, said purifier bringing a microorganism which removes a component of said exhaust gas in contact with said exhaust gas.

This invention also provides an engine comprising a combustion chamber for burning a mixture of fuel and air, an intake passage for supplying air to said combustion chamber, an exhaust recirculating passage for introducing a part of the exhaust gas in said combustion chamber into said intake passage, and a reaction purifier installed in said intake passage, said reaction purifier bringing a microorganism which removes a component of said exhaust gas in contact with intake air containing said exhaust gas.

This invention also provides an engine comprising a combustion chamber for burning a mixture of fuel and air, an intake passage for supplying air to said combustion chamber, and a reaction purifier for bringing a microorganism which feeds on nitrogen in contact with the air in said intake passage.

The details as well as other features and advantages of this invention are set forth in the remainder of the specification and are shown in the accompanying drawings.

DESCRIPTION OF THE PREFERRED EMBODIMENTS

Figure 1:
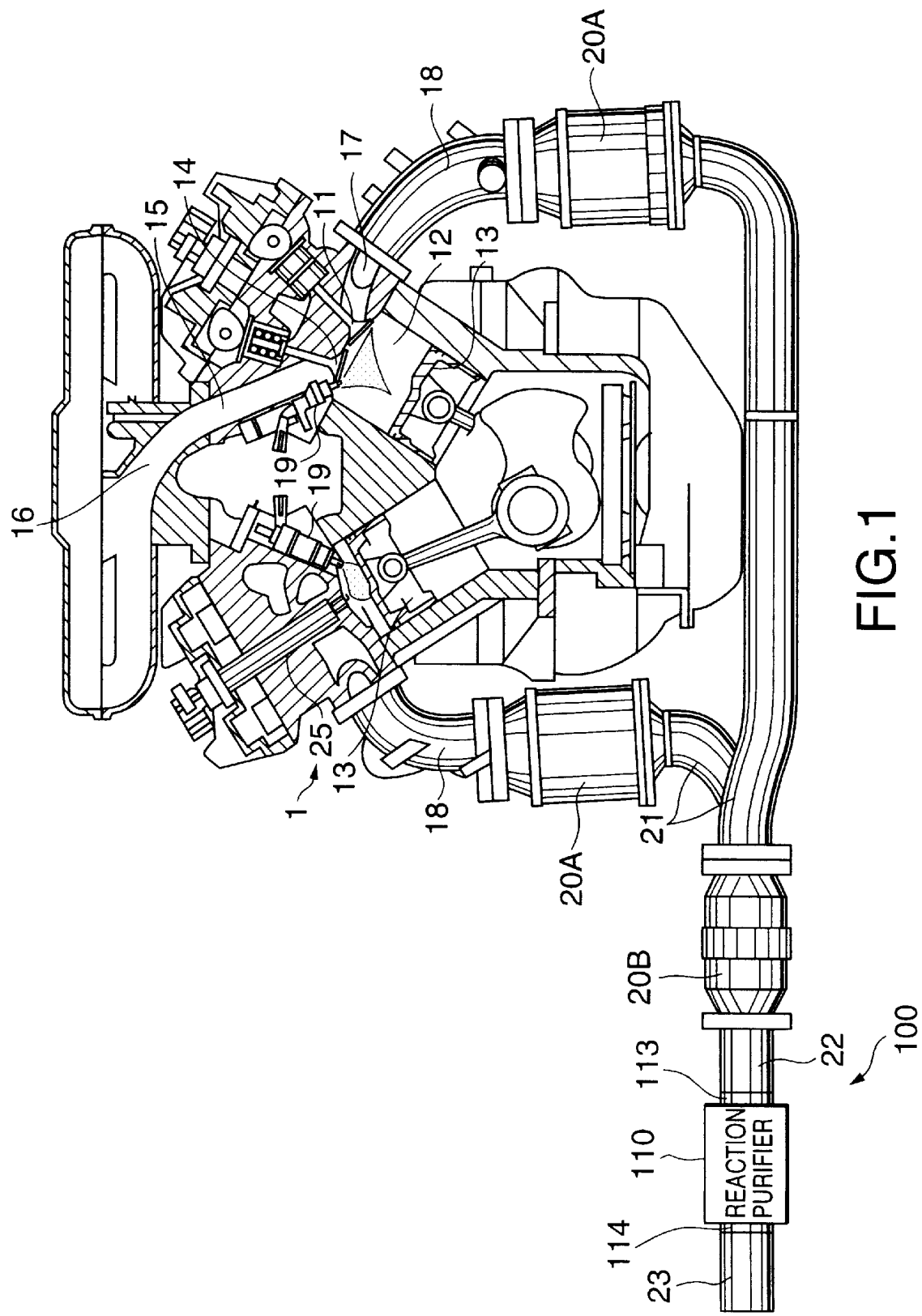
FIG. 1 is an elevation and a partial sectional view of a V-type engine comprising a reaction device according to this invention.

Referring to FIG. 1 of the drawings, a V-type gasoline engine 1 mounted on a vehicle comprises two banks, each of which comprises a plurality of combustion chambers 12. Each combustion chamber 12 is equipped with an intake valve 14, intake port 15, exhaust port 17 and exhaust valve 14. The intake ports 15 are connected to an intake pipe via an intake manifold 16. The exhaust ports 17 of each bank are connected to an exhaust pipe 21 via an exhaust manifold 18.

In the combustion chamber 12 of the engine 1, a mixture of fuel injected from a fuel injector 19 and air aspirated from the intake manifold 18 is compressed by the piston 13, ignited by a spark plug 25, and burnt. The energy of combustion causes the piston 13 to perform a back and forth motion which generates mechanical power.

The exhaust gas which is produced by the combustion is discharged via the exhaust port 17 and exhaust manifold 18. A catalytic converter 20A is disposed in a collector part of each exhaust manifold 18.

Two exhaust pipes 21 are connected to a common catalytic converter 20B.

These catalytic converters 20A, 20B comprise a three-way catalyst which purifies carbon monoxide (CO), hydrocarbons (HC) and nitrogen oxides (NOx). To further purify the exhaust gas which passed through the catalytic converters 20A, 20B, a reaction purifier 100 using microorganisms which consume specific components in the exhaust gas is connected downstream of the catalytic converter 20B via an exhaust pipe 22. The exhaust processed by the reaction purifier 100 is discharged into the atmosphere via an exhaust pipe 23.

Next, referring to FIG. 2, the construction of the reaction purifier 100 will be explained. The reaction purifier 100 is attached to a reactor 110 in which microorganisms in a culture fluid are brought in contact with exhaust gas, a pipe 120 which supplies culture fluid to the reactor 110, a screw pump 130 which recirculates culture fluid under a fixed pressure and a reservoir tank 140 which regulates the pressure of the culture fluid and separates microorganisms therefrom when it is required.

Various kinds of microorganisms which consume harmful components in the exhaust gas of the engine 1 may be selected for use in the reaction purifier 100. For example, the bacteria HD-1 discovered in 1996 feed on carbon dioxide ($CO_2$), hydrogen ($H_2$) and hydrocarbons (HC) without photosynthesis, and produce gasoline (cf. Molecular Biology of Pseudomonas by T. Imanaka and M. Morikawa, AMS Press, Washington, 1996, p.289–297).

This characteristic of feeding on specific components of exhaust gas without photosynthesis is a desirable characteristic for application to the reaction purifier 100. This is due to the fact that the transmissivity of chlorophyll to light which is indispensable to photosynthesis is not high, and it is difficult to irradiate all of the microorganisms with sufficient light so that chlorophyll can perform photosynthesis. There are also various difficulties involved in irradiating the vehicle-mounted reaction purifier 100 with light.

Preferred microorganisms for use in the reaction purifier 100 are, for example, thermophilic bacteria such as Thermococcus, Archaea and Sulfolobus. Desulfurolobus Ambivalens (JCM9191), Acidianus Infernus (JCM8955) and Acidianus Brierleyi (JCM8954) are also suitable. These microorganisms feed on $CO_2$, H2, S and HC in exhaust gas without photosynthesis, regenerating the fuel.

The JCM numbers referring to the above-named microorganisms have been assigned to microorganisms deposited at the Institute of Physical and Chemical Research in Japan, based on the Budapest Treaty.

The above-mentioned microorganisms are procaryotic microorganisms for which the most suitable environment is a temperature of 70–120° C. Generally, the exhaust gas of the engine 1 is at a relatively high temperature, and the temperature of the culture fluid also increases, so it is desirable to use thermophilic bacteria. It might be thought that at high temperature, the water of the culture fluid would tend to vaporize, however exhaust gas contains a large amount of water vapor and is effectively saturated, so not much water from the culture fluid vaporizes into the exhaust gas, and consequently it does not much decrease.

As an example of microorganisms which feed on sulfur or sulfur compounds in exhaust gas, the above-mentioned thermophilic bacteria, sulfur bacteria or crimson bacillus can be used. These types of bacteria consume $CO_2$ and sulfur as a source of nourishment. The culture fluid is different depending on the type of microorganism, but in general if it contains minerals such as magnesium phosphate, sodium chloride and an aqueous solution of nutritive substances such as amino acids or vitamins, HC, $O_2$, $CO_2$, NOx or sulfur are assimilated by the microorganisms as nutrients.

It is also desirable to supplement nutrients as may be appropriate depending on the kind of microorganisms and composition of the exhaust gas. Crude oil prior to refining, effluent from a beer factory or effluent from pulp refining, which are more economical than fuel, are examples of such additional nutrients.

The culture fluid is also controlled to a suitable pH value depending on the microorganism, e.g. by adding sulfuric acid ($H_2SO_4$).

When the microorganism produces matter which can be utilized as fuel such as in the case of the aforementioned HD-1 and thermophilic bacteria, the substances produced can be recycled as fuel by providing a means to recover these substances. For example, the substances produced may be recovered by centrifugal separation using the rotation torque of the engine 1 in the reservoir tank 140.

Water and activated sludge may also be used for the culture fluid. In this case, the sludge is a source of energy for microorganism activity, so this is very cost-effective. Alternatively, water and yeast extract may be used for the culture fluid. In this case, the yeast extract is the energy source for microorganisms, and the absorption rate of $CO_2$ is higher than when sludge is used as the culture fluid. If ammonium sulfate and sulfuric acid are also added to the culture fluid, the absorption rate of $CO_2$ rises further.

If the culture fluid also contains sulfur, this also provides an energy source for microorganisms, and the absorption rate of $CO_2$ is even higher.

Absorption rate and durability increase still more if minute amounts of components such as potassium dihydrogen phosphate, magnesium sulphate, calcium chloride, ferric chloride, manganese chloride and sodium tetraborate are added.

A further increase in absorption rate of $CO_2$ on engine startup is obtained by adding calcium carbonate.

It is desirable that the pH value of these culture fluids is maintained at 4.0 or less.

If Alcaligenes (JMC1474, 5485, 5490, 9657, 9658, 9656, 9659, 9660) are used as a microorganism, NOx in the exhaust gas can be consumed. As culture fluid, a culture fluid comprising water and activated sludge, a culture fluid containing water, peptone, meat extract and sodium chloride, or a culture fluid containing blood agar and rabbit blood are suitable.

A culture fluid consuming NOx is most effective if its temperature is maintained in a range of 20–40° C., and it is also preferable to maintain its pH value in the range of 5.0–8.0.

Substitutes containing enzymes found in living organisms which absorb exhaust gas may also be used. For example, enzymic cytochrome or hemoglobin, materials obtained by cross-linking of these substances, or materials obtained by polymerizing these substances, may be used as substitutes.

These substitutes are used instead of blood, and hemoglobin for example can carry gas molecules such as oxygen and $CO_2$ or NO. In other words, by bringing exhaust gas in contact with these substances, $CO_2$ and NO in the exhaust gas can be carried away, and they perform the same function as the above-mentioned microorganisms.

The reactor 110 comprises numerous capillary tubes 111 arranged effectively parallel to each other and spaced a small interval apart inside a case 112. All the capillary tubes 111 are connected to the pipe 120, and microorganisms are circulated inside the reaction purifier 100 by passing through the capillary tubes 111 together with culture fluid. The bore of the capillary tubes 111 is of the order of 10–500 $\mu$m, and numerous micro holes 111A having a diameter of from several tens of $\mu$m to several hundred $\mu$m which connect the inside and outside of the tubes are formed in the walls of the capillary tubes 111. The surface tension of the culture fluid in the capillary tubes 111 is higher than the pressure difference between the inside and outside of the tubes, so the micro holes do not leak culture fluid or microorganisms to the outside.

The micro holes 111A are set to have a diameter such that exhaust gas can pass through them subject to satisfying the above conditions. Due to this, the capillary tube walls function as a selection membrane allowing only gas components to pass through them without culture fluid.

The capillary tubes 111 may for example be gas exchange fibers of artificial lungs. The bore of the capillary tubes 111 and diameter of the micro holes 111A are set at suitable values depending on the culture fluid, the type of microorganism and the composition of exhaust gas. Tubes with holes of molecular size which allow oxygen ($O_2$), carbon dioxide ($CO_2$) and nitrogen oxides (NOx) to pass, such as dialysis membranes used in artificial dialysis, may also be used as the capillary tubes 111.

A gas inlet pipe 113 for introducing exhaust gas into the case 112 is connected to one side of the case 112. A gas exhaust pipe 114 to drain exhaust gas from the case 112 is connected to the other side of the case 112 opposite to the gas inlet pipe 113.

A filter 113A to prevent entry of dirt of large diameter into the case 112 is installed in the gas inlet pipe 113. An identical filter 114A is also installed in the gas exhaust pipe 114.

Referring again to FIG. 1, the gas inlet pipe 113 is connected to an exhaust pipe 22 leading from the catalytic converter 20B. Due to this, gas discharged from the catalytic converter 20B is led to the reactor 110.

The gas exhaust pipe 114 is connected to an exhaust pipe 23, and gas which has passed through the reaction purifier 100 is discharged into the atmosphere from the gas exhaust pipe 114 via the exhaust pipe 23.

Figure 2:
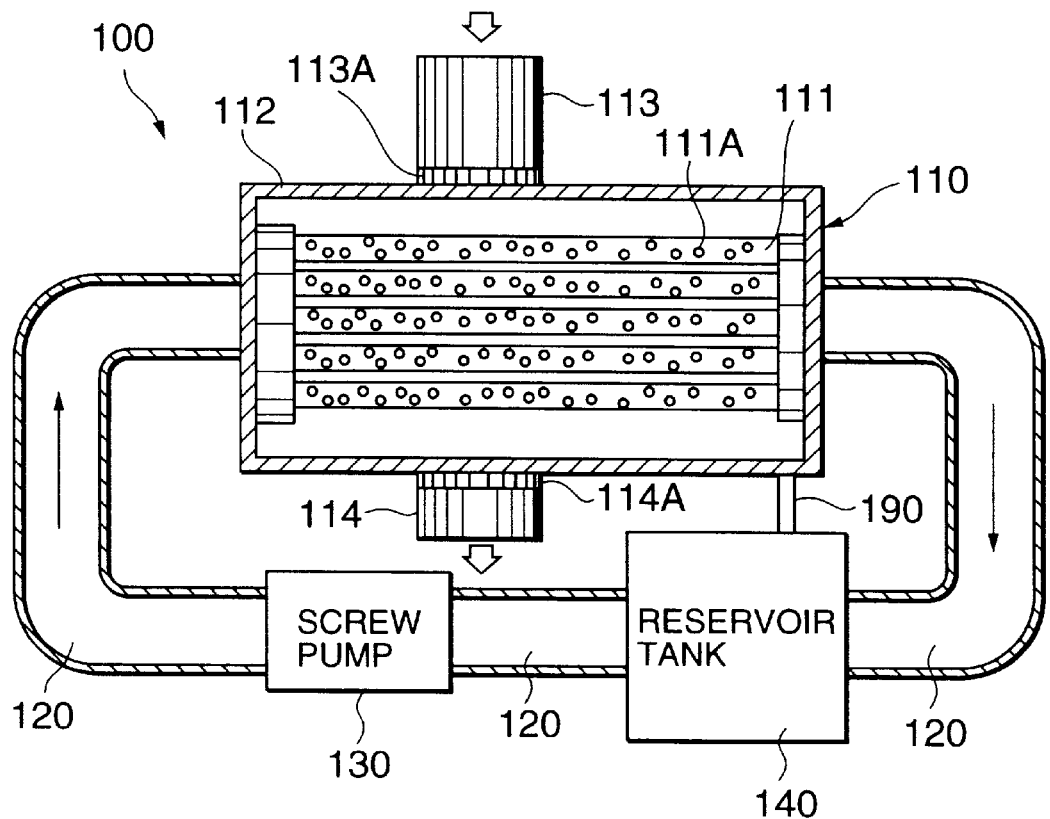
FIG. 2 is a schematic diagram of the reaction device.

When the pump 130 is driven, culture fluid which fills the capillary tubes 111 and pipe 120 circulates together with microorganisms through the reaction purifier 100 as shown by the arrow in FIG. 2. The pressure of the circulating culture fluid is adjusted to be effectively constant by the pump 130 and reservoir tank 140. The micro holes 111A of the capillary tubes 111 do not allow culture fluid to pass through them as mentioned hereabove, so the culture fluid flows in one direction through the capillary tubes 111 with almost no leakage. A very small amount of culture fluid which collects in the case 112 due to leakage from the capillary tubes 111 returns to the reservoir tank 140 via a pipe 190.

The exhaust gas produced due to combustion in the engine 1 is purified by passing through the catalytic converter 20A via the exhaust manifold 18 and then through the catalytic converter 20B. The exhaust gas discharged from the catalytic converter 20B flows into the case 112 of the reactor 110, and through the gaps between the numerous capillary tubes 111. The micro holes 111A in the capillary tubes 111 are of such a diameter as to allow passage of exhaust gas, so the exhaust gas comes in contact with microorganisms via the micro holes 111A as it flows in the gaps between the capillary tubes, and the microorganisms consume specific components in the exhaust gas. The components consumed by the microorganisms are assimilated by the microorganisms or incorporated in the culture fluid, and the exhaust gas is purified by a corresponding amount. Exhaust gas which has passed through the reactor 110 in this way is discharged into the atmosphere via an exhaust pipe 23.

The purification rate of exhaust gas increases together with the frequency of contact between exhaust gas and microorganisms. Therefore, if the circulation rate of culture fluid is increased the purification rate also increases, however if the output of the screw pump 130 is raised, the proportion of microorganisms which die due to the drive of the pump 130 increases.

At the same time, culture fluid circulating through the reaction purifier 100 receives heat from the exhaust gas circulating in the reactor 110, and radiates heat to other parts. If the circulation rate is too low, the temperature of the culture fluid rises excessively while the culture fluid is passing through the reactor 110.

Therefore, it is desirable to determine the circulation rate of culture fluid considering the effect of the drive of the pump 130 and temperature rise in the reaction unit 110.

It is in the reactor 110 that microorganism activity is required. The pump 130 may therefore be a type which permits the rotation speed to be varied. The rotation speed can then be adjusted and the circulation rate varied so that the temperature of the culture fluid in the reactor 110 is optimized. In this case, a temperature sensor 115 is provided in the reactor 110, and the rotation speed of the pump 130 is adjusted according to the temperature detected by the temperature sensor 115. The temperature of the culture fluid must be set in an appropriate range according to the type of microorganism. Various methods may be used to control the temperature as mentioned hereafter.

As temperature control of culture fluid is not performed when the engine 1 has stopped, the temperature of the culture fluid drops according to the ambient temperature when the engine 1 stops for a long time. However, even if the temperature of culture fluid drops, the microorganisms enter a state of "suspended animation", and when the engine 1 starts so that the temperature of the culture fluid rises to an appropriate range, the microorganisms resume their activity.

For example, even if the engine is left in a low temperature range of 0–20° C. for several months, the microorganisms are reactivated when the temperature of the culture fluid rises again.

Figure 3:
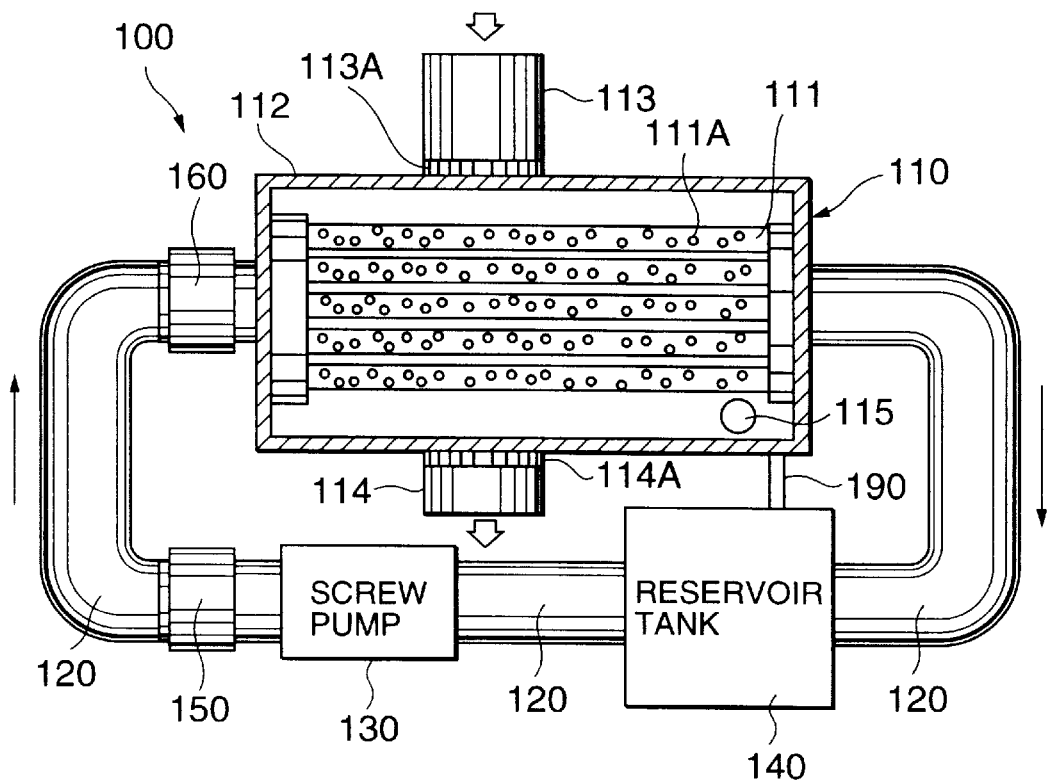
FIG. 3 is similar to FIG. 2, but showing a second embodiment of this invention.

Next, a second embodiment of this invention will be described referring to FIG. 3.

In this embodiment, circulating culture fluid is heated by a heater 160 upstream of the reactor 110 to provide an optimum environment for the microorganisms, and the fluid is then cooled by a cooler 150 downstream of the pump 130. The cooler 150 is arranged midway along the pipe 120 connecting the pump 130 and heater 160. The temperature sensor 115 is also installed which measures the temperature in the case 112 or the temperature of the culture fluid in the reactor 110.

Figure 4:
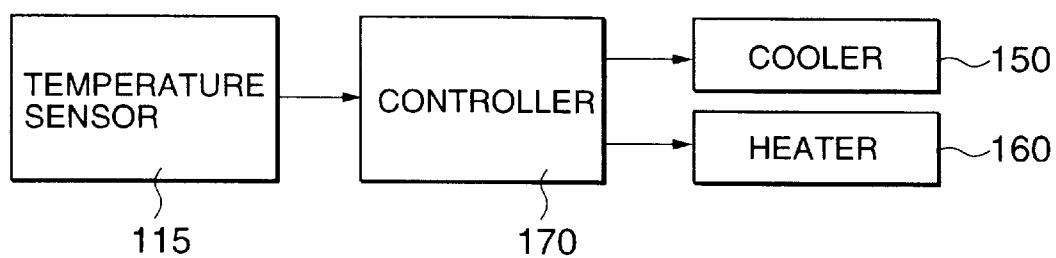
FIG. 4 is a block diagram showing the construction of a reaction device according to the second embodiment.

This embodiment further comprises a controller 170 for operating the cooler 150 and heater 160 according to an output signal from the temperature sensor 115 as shown in FIG. 4. The controller 170 comprises a microcomputer comprising a central processing unit (CPU), read-only memory (ROM), random-access memory (RAM) and input-output interface (I/O interface).

It is desirable to maintain the temperature of the culture fluid in a predetermined temperature range corresponding to the microorganism used, and this embodiment realizes such a temperature control. The walls of the reservoir tank 140 are preferably adiabatic walls for precise temperature adjustment and maintenance.

Figure 5:
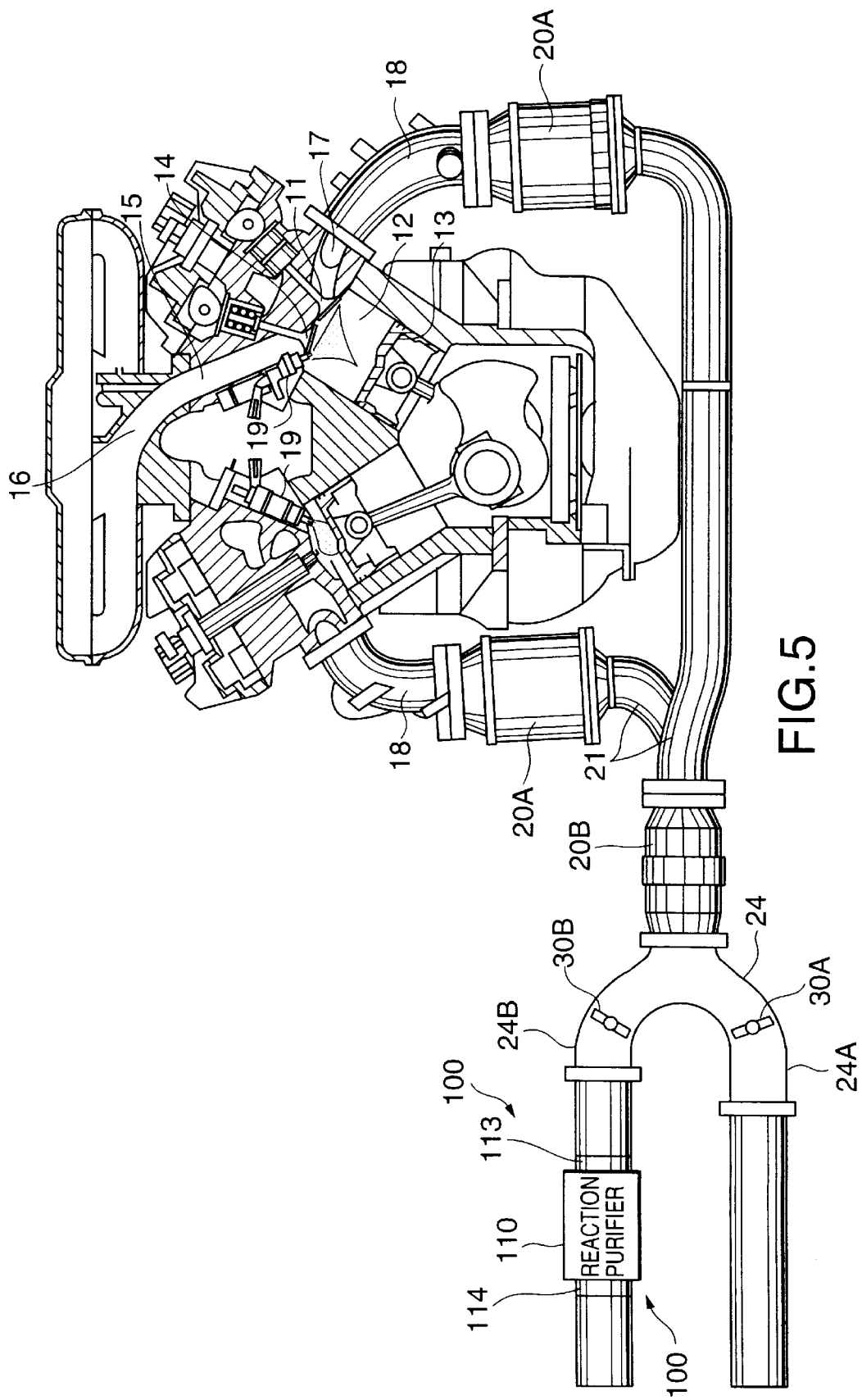
FIG. 5 is similar to FIG. 1, but showing a third embodiment of this invention.

Next, a third embodiment of this invention will be described referring to FIG. 5.

In this embodiment, a branched exhaust pipe 24 comprising branch pipes 24A, 24B is connected to the catalytic converter 20B, the reaction purifier 100 is arranged in the branch pipe 24B, and the branch pipe 24A discharges into the atmosphere.

Valves 30A, 30B to change over between the exhaust gas discharge paths are provided in the branch pipes 24A and 24B.

According to this embodiment, exhaust gas can be discharged via the reaction purifier 100 only when necessary. For example, when the exhaust gas temperature is far removed from the most suitable temperature for microorganisms, the exhaust gas can be prevented from being sent through the reaction purifier 100 until the temperature of the culture fluid is controlled to within an appropriate range. Also, the opening and closing of the change-over valves 30A, 30B may be controlled to maintain the temperature of the culture fluid within the appropriate range by effectively using the temperature of the exhaust gas.

Immediately after engine startup, as the catalytic converter 20A and catalytic converter 20B are at low temperature, the exhaust gas purifying performance of the catalyst is low. In this case, the exhaust gas is discharged via the reaction purifier 100 for a fixed period after engine startup.

In other words, microorganisms are used for purifying exhaust gas when purification of exhaust gas due to a catalyst is difficult.

Figure 6:
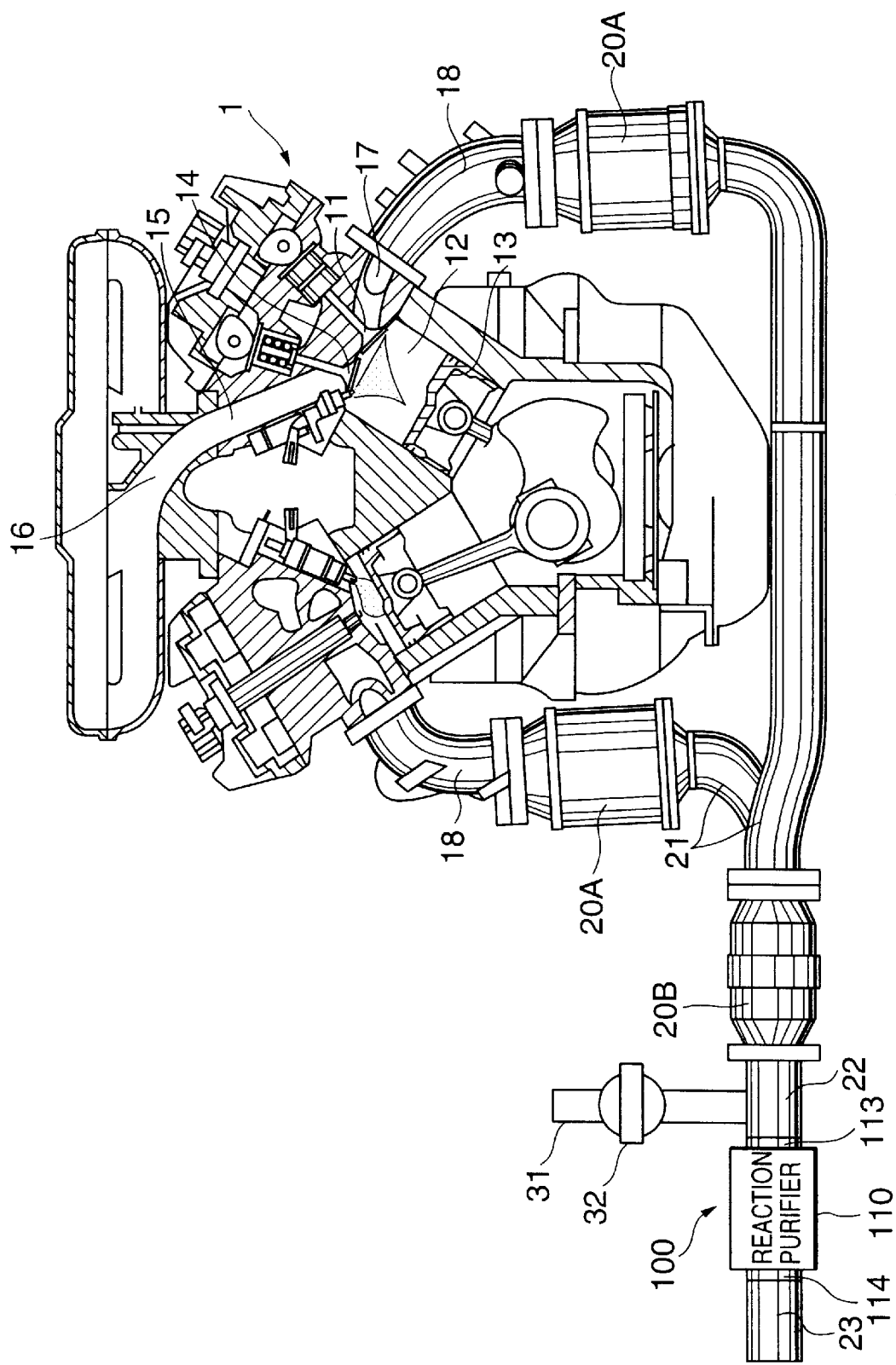
FIG. 6 is similar to FIG. 1, but showing a fourth embodiment of this invention.

Next, a fourth embodiment of this invention will be described referring to FIG. 6.

In this embodiment, an inlet pipe 31 to introduce secondary air is connected to the exhaust pipe 22 which leads gas discharged from the catalytic converter 20B into the reaction purifier 100. The secondary air led in from the inlet pipe 31 cools exhaust gas which has passed through the catalytic converter 20B by mixing with it. Due to this, the temperature of the exhaust gas flowing into the reaction purifier 100 falls.

A valve 32 which adjusts the amount of secondary air introduced is provided in the inlet pipe 31. It is also desirable to supply pressurized air to the inlet pipe 31 from a pressurizer installed separately. Also in this embodiment, it is easy to maintain the temperature of culture fluid in the reaction purifier 100 at an optimum value for activity of microorganisms.

Figure 7:
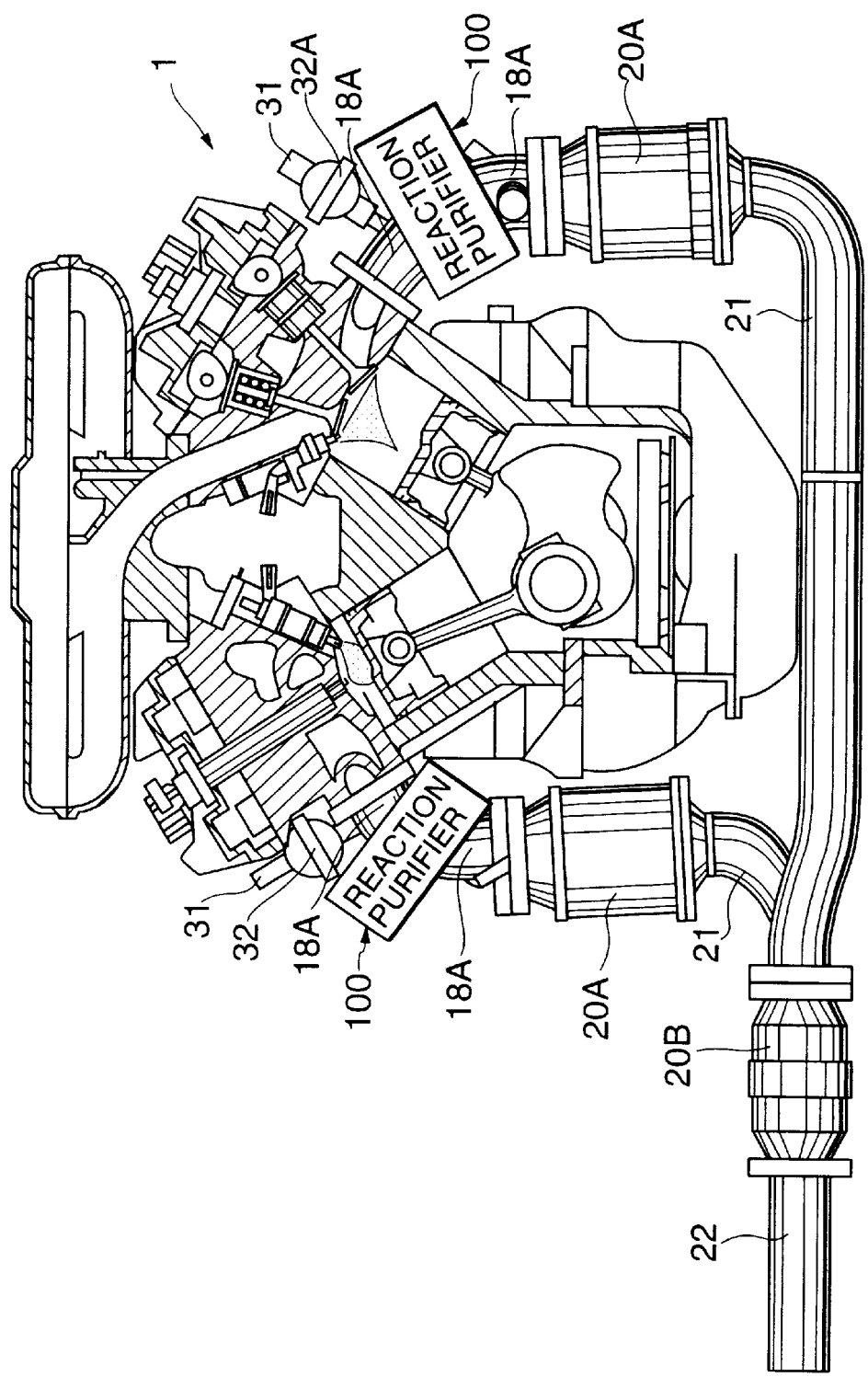
FIG. 7 is similar to FIG. 1, but showing a fifth embodiment of this invention.

Next, a fifth embodiment of this invention will be described referring to FIG. 7.

In this embodiment, the positions of the reaction purifier 100 and catalytic converters 20A, 20B are reversed.

Specifically, the reaction purifier 100 is arranged midway in an exhaust manifold 18A of each bank of the engine 1.

After the exhaust gas has passed through the reaction purifier 100, it is led into the catalytic converter 20A. Exhaust gas which has passed through the catalytic converter 20A is sent to the catalytic converter 20B through the exhaust pipe 21. The exhaust gas which has been processed in the catalytic converter 20B is discharged into the atmosphere from the exhaust pipe 22.

The inlet pipe 31 provided with the valve 32 for introducing secondary air is connected to the exhaust manifold 18A. It is desirable to aspirate secondary air into the inlet pipe 31 by using exhaust pressure pulsation. In that case, a check valve is provided in the inlet pipe 31.

In this embodiment also, it is easy to maintain the temperature of the culture fluid at a value most suitable for activity of microorganisms.

According to this embodiment, exhaust gas is led into the reaction purifier 100 before passing through the catalytic converters 20A, 20B, so the exhaust gas supplied to the reaction purifier is relatively rich in gaseous components which are a source of nutrients for microorganisms. This embodiment is therefore particularly desirable to activate microorganisms when microorganisms feeding on these gaseous components are used in the reaction purifier 100.

Figure 8:
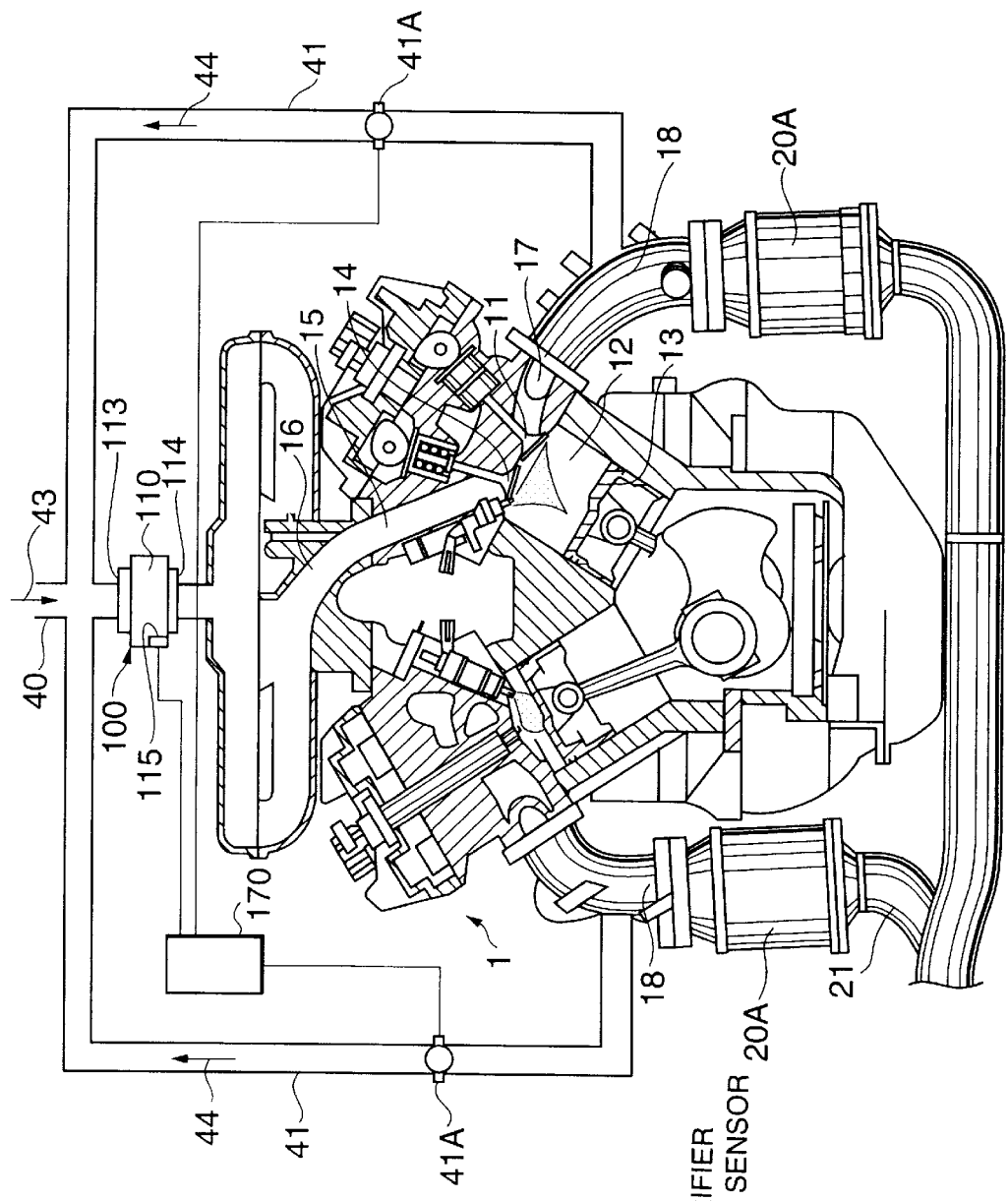
FIG. 8 is similar to FIG. 1, but showing a sixth embodiment of this invention.

Next, a sixth embodiment of this invention will be described referring to FIG. 8.

In this embodiment, the invention is applied to a V type engine 1 comprising an exhaust recirculation (EGR) device which recirculates part of the exhaust gas into an intake pipe 40 of the engine 1.

For this purpose, an end of an exhaust recirculation pipe 41 is connected the intake pipe 40. The other end of the exhaust recirculation pipe 41 is connected to an intermediate part of the exhaust manifold 18 of each bank, and part of the exhaust gas discharged by the exhaust manifold 18 is recirculated into the intake pipe 40. An EGR valve 41A for controlling the recirculation amount of exhaust gas is provided in an intermediate part of the exhaust recirculation pipe 41.

The reaction purifier 100 is arranged midway from the junction between the inlet pipe 40 and exhaust recirculation pipe 41 to an intake manifold 16. Therefore, a mixture of fresh air 43 and exhaust gas 44 flows into the reactor 110 of the reaction purifier 100. The gas mixture which passed through the reactor 110 is aspirated into the combustion chamber 12.

The reaction purifier 100 is provided with a heater and cooler as in the recirculation path of the culture fluid as in the aforesaid second embodiment. A temperature sensor 115 is also provided in the reactor 110 as in the second embodiment.

The temperature detected by the temperature sensor 115 is input as a signal to the controller 170 which has an identical construction as in the case of the second embodiment. Based on this detected temperature, the controller 170 controls the operation of the cooler and heater.

The controller 170 also regulates the opening of the EGR valve 41A based on the detected temperature to control the exhaust recirculation amount so that the temperature in the reactor 110 is suitable for activity of the microorganisms.

When it is desired to raise the temperature of the culture fluid the opening of the EGR valve 41A is increased, and when it is desired to lower the temperature of the culture fluid the opening of the EGR valve 41A is decreased.

In this case, it is preferable to control the EGR valve 41A not only to control the exhaust recirculation amount depending only on the temperature detected by the temperature sensor 115, but also to take advantage of the original purpose of the EGR system, i.e. to reduce nitrogen oxides (NOx) and improve fuel cost-performance.

To achieve this, it is preferable to measure a numerical value for the harmful components in the exhaust gas which is finally discharged into the atmosphere by experiment or calculation, and to control the EGR valve 41 to minimize this value. The numerical value may also be determined taking account of fuel-cost performance.

By providing the reactor 110 in the inlet pipe 40 as in this embodiment, microorganisms would be burnt in the combustion chamber 12 even if they were to leak out from the reactor 110, and consequently, they would not escape into the atmosphere.

Preferably, the microorganisms used in this embodiment are microorganisms which feed on NOx or $CO_2$, however microorganisms which feed on nitrogen gas such as may also be used. In this case, the partial pressure of nitrogen in the intake air of the engine 1 falls, the amount of oxygen introduced into the combustion chamber 12 increases, and a supercharging effect is obtained in the engine 1.

Figure 9:
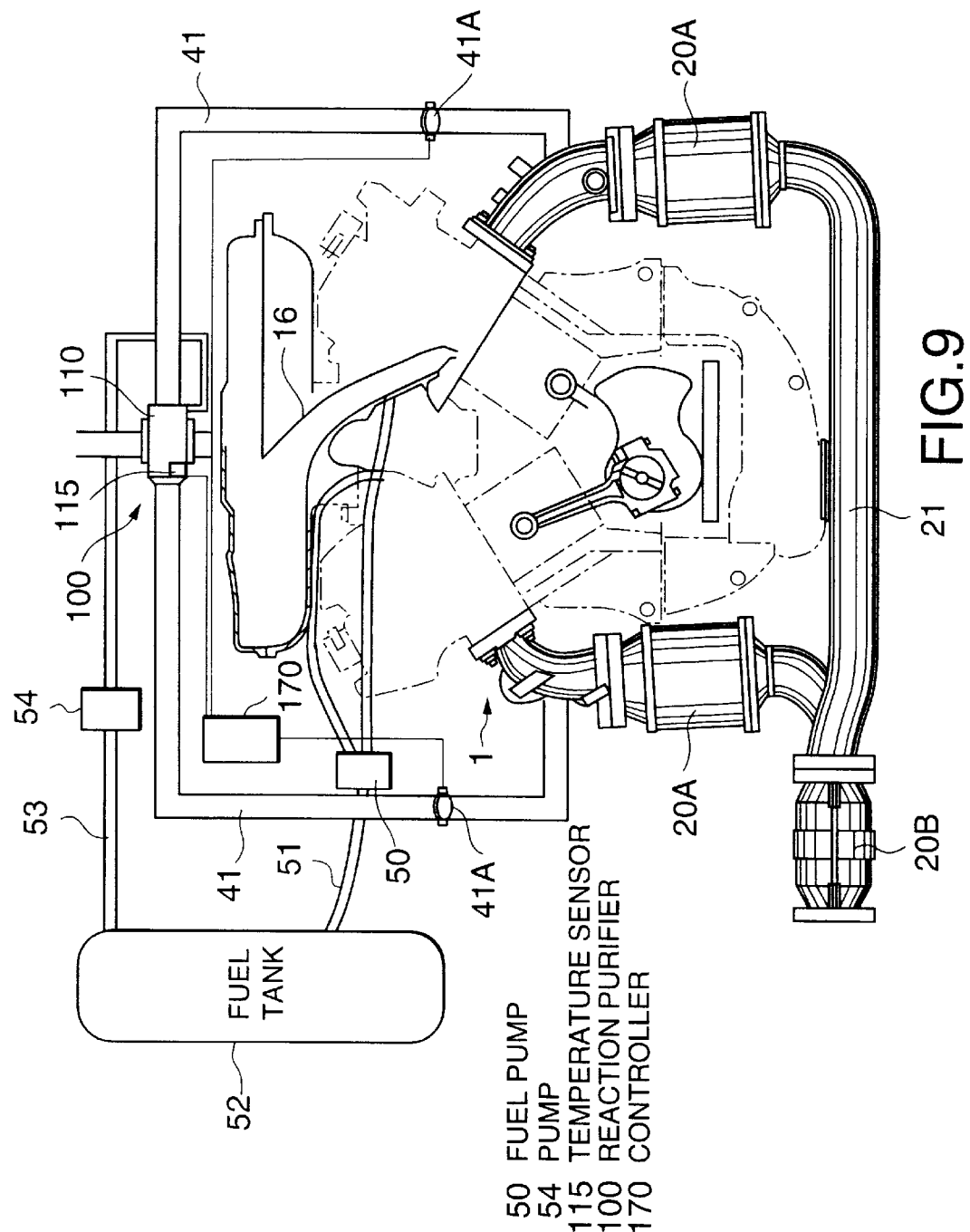
FIG. 9 is similar to FIG. 1, but showing a seventh embodiment of this invention.

Next, a seventh embodiment of this invention will be described referring to FIG. 9.

In this embodiment, the reaction purifier 100 is arranged as in the case of the aforesaid sixth embodiment, fuel produced by the microorganisms in the reaction purifier 100 from the exhaust gas is returned to the fuel tank 52 via a return pipe 53 and a pump 54. By using microorganisms which feed on $CO_2$ to regenerate fuel in the reaction purifier 100, the regenerated fuel can be recycled. This fuel is supplied to the engine 1 via a supply pipe 51 and fuel pump 50 together with fuel collected in the fuel tank 52. Due to use of this regenerated fuel, engine fuel consumption can be reduced.

Figure 10:
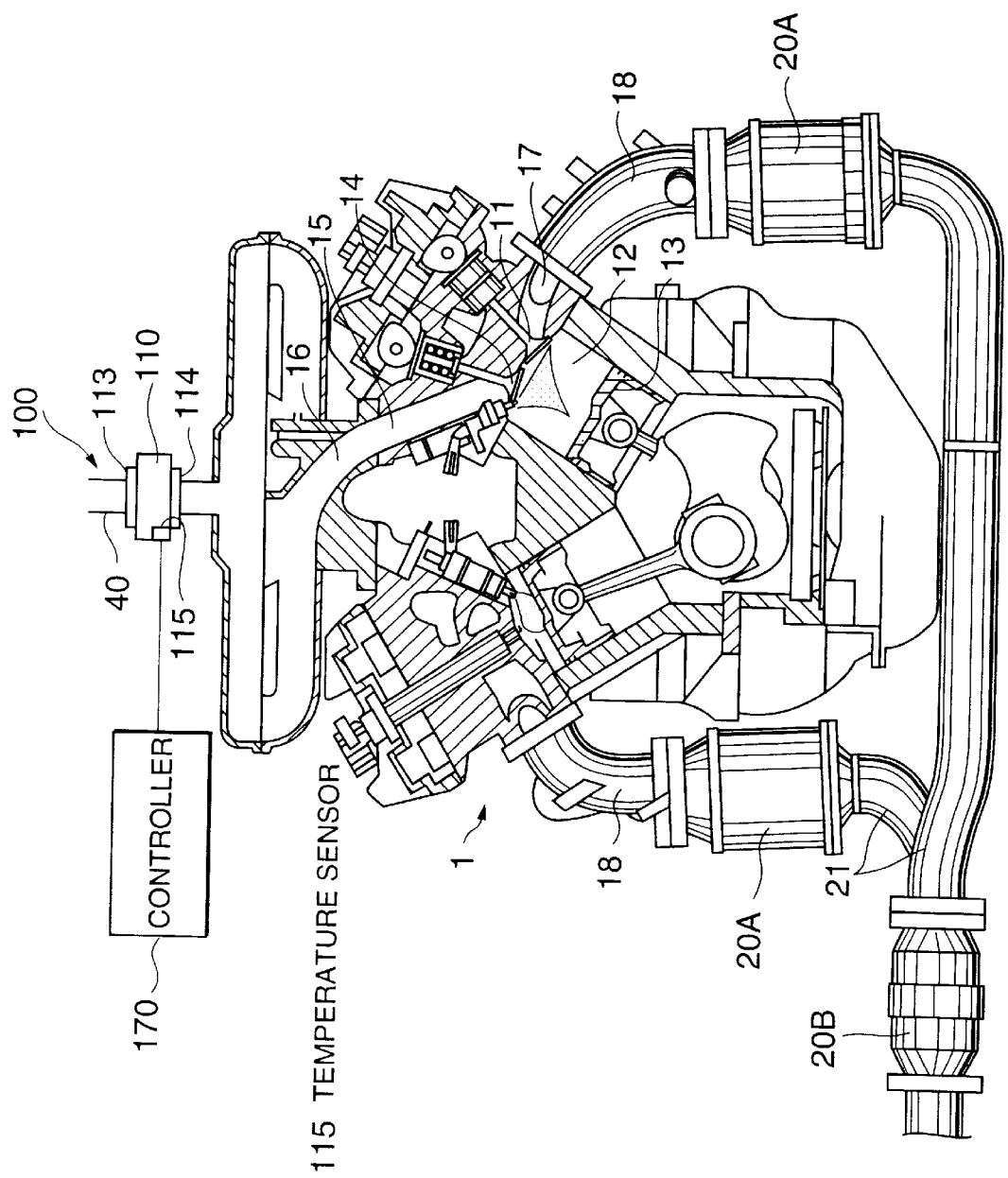
FIG. 10 is similar to FIG. 1, but showing an eighth embodiment of this invention.

Next, an eighth embodiment of this invention will be described referring to FIG. 10.

In this embodiment, the reaction purifier 100 is provided in the intake pipe 40 as in the case of the aforesaid seventh embodiment, but unlike the seventh embodiment, the engine 1 does not perform exhaust recirculation. In the reaction purifier 100, microorganisms which feed on nitrogen gas such as are used. A temperature sensor 115 connected to the controller 170 is installed in the reactor 110 as in the case of the seventh embodiment, and the controller 170 controls a cooler and heater, not shown.

In this embodiment, the controller 170 also increases and controls the fuel injection amount injected from a fuel injector 19. This is due to the fact that the oxygen concentration of the intake air of the engine 1 increases due to the use of microorganisms which feed on nitrogen gas, and permits the engine output to be increased.

Figures 11, 12:
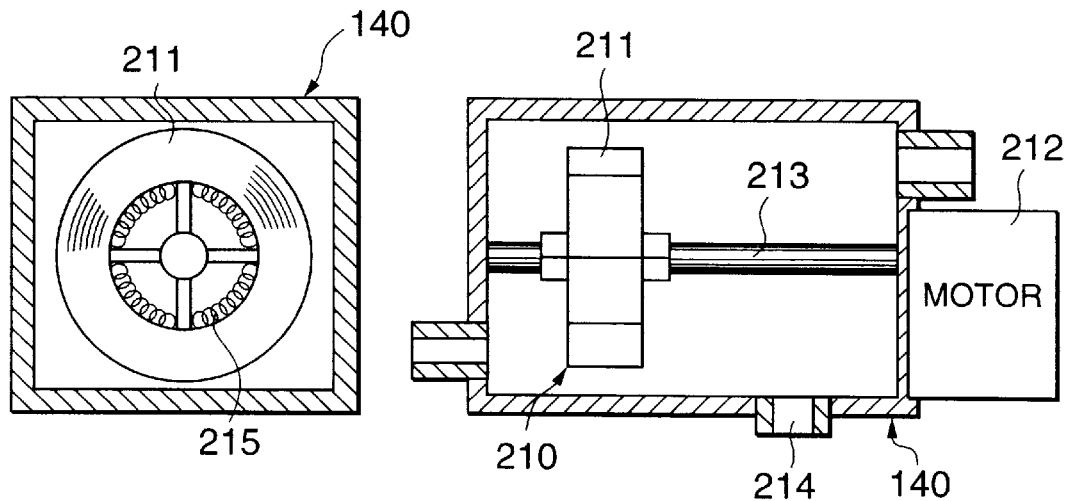
FIG. 11 is a schematic cross sectional view of a centrifugal separation reservoir tank according to a ninth embodiment of this invention.
FIG. 12 is a schematic longitudinal sectional view of the reservoir tank.

Next, a ninth embodiment of this invention will be described referring to FIGS. 11 and 12.

This embodiment relates to the construction of the reservoir tank 140. In this embodiment, a centrifugal separator 210 for separating microorganisms is provided inside the reservoir tank 140. The centrifugal separator 210 is provided with a ring 211, and a motor 212 which rotates the ring 211 via an axis 213. Microorganisms 215 in the reservoir tank 140 adhere to the inner circumference of the rotating ring 211 due to the centrifugal force. A discharge hole 214 which discharges culture fluid via a valve, not shown, is formed in the reservoir tank 140.

When the engine stops for a long time, the culture fluid is discarded, and the microorganisms which are separated by the centrifugal separator 210 are dried so that they enter a state of suspended animation. The microorganisms can therefore be preserved for a long period of time. The centrifugal separator 210 can also be used to temporarily separate microorganisms when the culture fluid is changed, or to remove some of the microorganisms if they overproliferate in the reaction purifier.

This embodiment may be combined with any of the first to eighth embodiments.

Figure 13:
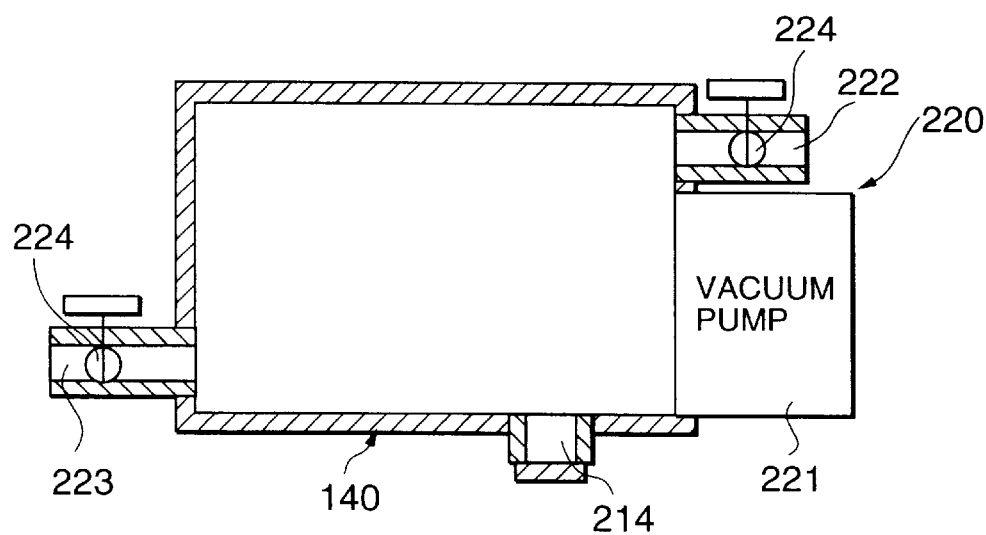
FIG. 13 is a schematic longitudinal sectional view of a reservoir tank according to a tenth embodiment of this invention.

Finally, a tenth embodiment of this invention will be described referring to FIG. 13.

In this embodiment, a vacuum drier 220 is provided in the reservoir tank 140 instead of the above-mentioned centrifugal separator. The vacuum drier 220 comprises a vacuum pump 221 installed outside the reservoir tank 140, and valves 224 respectively provided at a tank inlet 222 and outlet 223.

When separation of microorganisms in the culture fluid becomes necessary due to the reasons given in the aforesaid ninth embodiment, the valve 224 and discharge hole 214 are closed and the vacuum pump 221 is operated. The pressure in the reservoir tank 140 therefore falls, and liquid components evaporate so that the microorganisms are left as a dry powder. Microorganisms in a dry powder state can be preserved for a long period of time in a state of suspended animation.

Although the invention has been described above by reference to certain embodiments of the invention, the invention is not limited to the embodiments described above. Modifications and variations of the embodiments in light of the above teachings. For example, the above-mentioned embodiments were described in the case of their application to a gasoline engine, but this invention may also be applied to a diesel engine. However the exhaust gas temperature is different in the case of a gasoline engine and a diesel engine, so the type of microorganism applied to the reaction purifier 100 must be suitably varied according to the exhaust temperature of the engine.

When a mixture of gasoline and air is compressed with a compression ratio of thirteen or more, the exhaust temperature becomes excessively high for the activity of the microorganisms, so it is preferable that the compression ratio does not exceed thirteen. This also has the advantage that engine knocking does not easily occur. Likewise, in a diesel engine, if the mixture of diesel oil and air is compressed with a compression ratio of twenty or more, the exhaust temperature becomes excessively high for microorganism activity, so it is desirable that the compression ratio does not exceed twenty. This also has the advantage that energy losses due to engine heating are reduced.

In a gasoline engine wherein fuel and air are supplied to a combustion chamber at a lean mixing ratio less than the stoichiometric air-fuel ratio, oxidation of carbon monoxide (CO) by the three-way catalyst proceeds efficiently, but reduction of NOx is difficult due to the excess oxygen. If this invention is applied to such a case, NOx may be effectively removed by microorganisms. The reaction purifier 100 is also effective for an engine which uses an oxidizing catalyst in the catalytic converter instead of a three-way catalyst.

This invention may be applied also to an engine burning hydrogen gas as fuel. In this case, microorganisms should be used which feed on NOx or hydrogen in the exhaust gas.

This invention may also be applied to a gas turbine engine. A gas turbine engine has flexibility in that any kind of fuel can be used, so if this invention is applied to a gas turbine engine, substances produced by the microorganisms can easily be used as fuel.

The contents of Tokugan Hei 10-13960, with a filing date of Jan. 27, 1998 in Japan and Tokugan Hei 10-182317 with a filing date of Jun. 29, 1998 in Japan, are hereby incorporated by reference.

The embodiments of this invention in which an exclusive property or privilege is claimed are defined as follows:

What is claimed is:

1. A method for removing a component from an exhaust gas of an engine, comprising the steps of:
    (a) burning a mixture of fuel and air in a combustion chamber of an engine to produce an exhaust gas;
    (b) passing the exhaust gas through an exhaust gas passage connected to the combustion chamber; and
    (c) treating the exhaust gas with a purifier installed inside the exhaust gas passage,
    wherein the purifier contacts the exhaust gas with a microorganism which removes a component of the exhaust gas,
    and wherein the microorganism comprises a thermophilic organism, and wherein the microorganism is mixed with a culture fluid containing water and activated sludge.

2. The method according to claim 1, wherein the microorganism feeds on carbon dioxide in the exhaust gas.

3. The method according to claim 1, wherein the microorganism is a microorganism of the type HD-1.

4. The method according to claim 1, wherein the microorganism is an Alcaligenes microorganism.

5. The method according to claim 1, wherein the microorganism feeds on hydrocarbons in the exhaust gas.

6. An engine comprising:
    a combustion chamber for burning a mixture of fuel and air, an exhaust gas passage connected to said combustion chamber, and a reaction purifier installed in said passage, said purifier bringing a microorganism which removes a component of said exhaust gas in contact with said exhaust gas, wherein the microorganism comprises a thermophilic organism, and wherein the microorganism is mixed with a culture fluid containing water and activated sludge.

7. An engine as defined in claim 6, wherein said microorganism is a microorganism which feeds on said component without photosynthesis.

8. An engine as defined in claim 6, wherein said microorganism is mixed with a culture fluid, and said reaction purifier comprises a tube wherein a micro hole is formed which does not allow passage of said culture fluid but does allow passage of said exhaust gas, a circulating mechanism for circulating said culture fluid via said tube, and a casing connected to said passage covering said tube for leading exhaust gas into the space surrounding said tube.

9. An engine as defined in claim 8, wherein said reaction purifier comprises a temperature adjusting device for adjusting the temperature of said culture fluid.

10. An engine as defined in claim 9, wherein said reaction purifier comprises a reservoir tank comprising adiabatic walls for collecting said culture fluid.

11. An engine as defined in claim 9, wherein said temperature adjusting device comprises a temperature sensor for detecting a temperature in said casing, a cooler for cooling said culture fluid, a heater for heating said culture fluid, and a microprocessor programmed to control said cooler and said heater based on the temperature in said casing.

12. An engine as defined in claim 6, wherein said reaction purifier comprises a reservoir tank for collecting said culture fluid, and said reservoir tank is provided with a centrifugal separator for separating said microorganism from the culture fluid.

13. An engine as defined in claim 6, wherein said reaction purifier comprises a reservoir tank for collecting said culture fluid, and said reservoir tank comprises a vacuum drier for vacuum drying said microorganism.

14. An engine as defined in claim 6, wherein said engine further comprises a mechanism for introducing atmospheric air into exhaust gas to be brought in contact with said microorganism.

15. An engine as defined in claim 6, wherein said microorganism is a microorganism which feeds on carbon dioxide in said exhaust gas.

16. An engine as defined in claim 15, wherein said microorganism is a microorganism which feeds on carbon dioxide to regenerate fuel.

17. An engine as defined in claim 16, wherein said microorganism is a microorganism of the type HD-1.

18. An engine as defined in claim 6, wherein said microorganism is a microorganism which feeds on nitrogen oxides in said exhaust gas.

19. An engine as defined in claim 6, wherein said microorganism is a microorganism which feeds on hydrocarbons in said exhaust gas.

20. An engine as defined in claim 6, wherein said microorganism comprises Archaea.

21. An engine as defined in claim 6, wherein said microorganism comprises either one of Desulfurolobus and Acidianus.

22. An engine as defined in claim 6, wherein said microorganism is mixed with a culture fluid containing water and yeast extract.

23. An engine as defined in claim 22, wherein said culture fluid further comprises ammonium sulfate and sulfuric acid.

24. An engine as defined in claim 23, wherein said culture fluid further comprises one of potassium dihydrogen phosphate, magnesium sulfate, calcium chloride, ferric chloride, manganese chloride, sodium tetraborate, sulfur and calcium carbonate.

25. An engine as defined in claim 6, wherein said microorganism is a microorganism which is activated in a temperature range of 70–120° C.

26. An engine as defined in claim 6, wherein said microorganism is mixed with a culture fluid having a pH value of 4.0 or less.

27. An engine as defined in claim 6, wherein said microorganism comprises an Alcaligenes microorganism.

28. An engine as defined in claim 27, wherein said Alcaligenes microorganism is mixed with a culture fluid containing water, peptone, meat extract, and sodium chloride.

29. An engine as defined in claim 27, wherein said Alcaligenes microorganism is mixed with a culture fluid containing water, blood agar and rabbit blood.

30. An engine as defined in claim 27, wherein said Alcaligenes microorganism is mixed with a culture fluid maintained in a temperature range of 20–40° C.

31. An engine as defined in claim 27, wherein said Alcaligenes microorganism is mixed with a culture fluid having a pH value in the range of 5.0–8.0.

32. An engine as defined in claim 6, wherein said microorganism feeds on either one of sulfur gas and gaseous sulfur compounds in said exhaust gas.

33. An engine as defined in claim 6, wherein said exhaust gas passage comprises a branched exhaust pipe comprising a branch pipe for leading said exhaust gas into said reaction purifier and a branch pipe for bypassing said reaction purifier to lead said exhaust gas into the atmosphere, and valves for selectively leading said exhaust gas into said two branch pipes.

34. An engine as defined in claim 33 wherein said engine comprises a catalytic converter having a noble metal catalyst for purifying exhaust gas installed in said exhaust gas passage.

35. An engine as defined in claim 6, wherein said engine is an engine which uses gasoline as fuel.

36. An engine as defined in claim 35, wherein said engine is an engine which burns gasoline and air at an air-fuel ratio leaner than the stoichiometric air-fuel ratio.

37. An engine as defined in claim 35, wherein said engine is an engine which burns gasoline and air compressed within a range not exceeding a compression ratio of thirteen.

38. An engine as defined in claim 6, wherein said engine further comprises a catalytic converter having a noble metal catalyst for purifying exhaust gas installed in said passage, and said reaction purifier is arranged downstream of said catalytic converter in said passage.

39. An engine as defined in claim 6, wherein said engine is an engine which uses diesel oil as fuel.

40. An engine as defined in claim 39, wherein said engine is an engine which burns diesel oil and air compressed within a range not exceeding a compression ratio of twenty.

41. An engine as defined in claim 6, wherein said engine is an engine which burns hydrogen gas as fuel, and said microorganism feeds on either nitrogen oxides or hydrogen in said exhaust gas.

42. An engine as defined in claim 6, wherein said microorganism comprises an enzyme in a living organism.

43. An engine as defined in claim 42, wherein said enzyme in a living organism is an enzyme which removes carbon dioxide in exhaust gas.

44. An engine as defined in claim 42, wherein said enzyme in a living organism is an enzyme which removes carbon monoxide in exhaust gas.

45. An engine as defined in claim 42, wherein said enzyme in a living organism comprises hemoglobin.

46. An engine as defined in claim 6, wherein said enzyme in a living organism comprises cytochrome enzyme.

47. An engine as defined in claim 6, wherein said engine comprises a gas turbine.

48. An engine as defined in claim 6, wherein said engine further comprises a catalytic converter having a noble metal catalyst for purifying exhaust gas installed in said passage, and said reaction purifier is arranged in a passage leading from said combustion chamber to said catalytic converter.

* * * * *